May 12, 1970     L. A. MYERS     3,511,215
POULTRY FEEDER
Filed Dec. 26, 1967     2 Sheets-Sheet 1
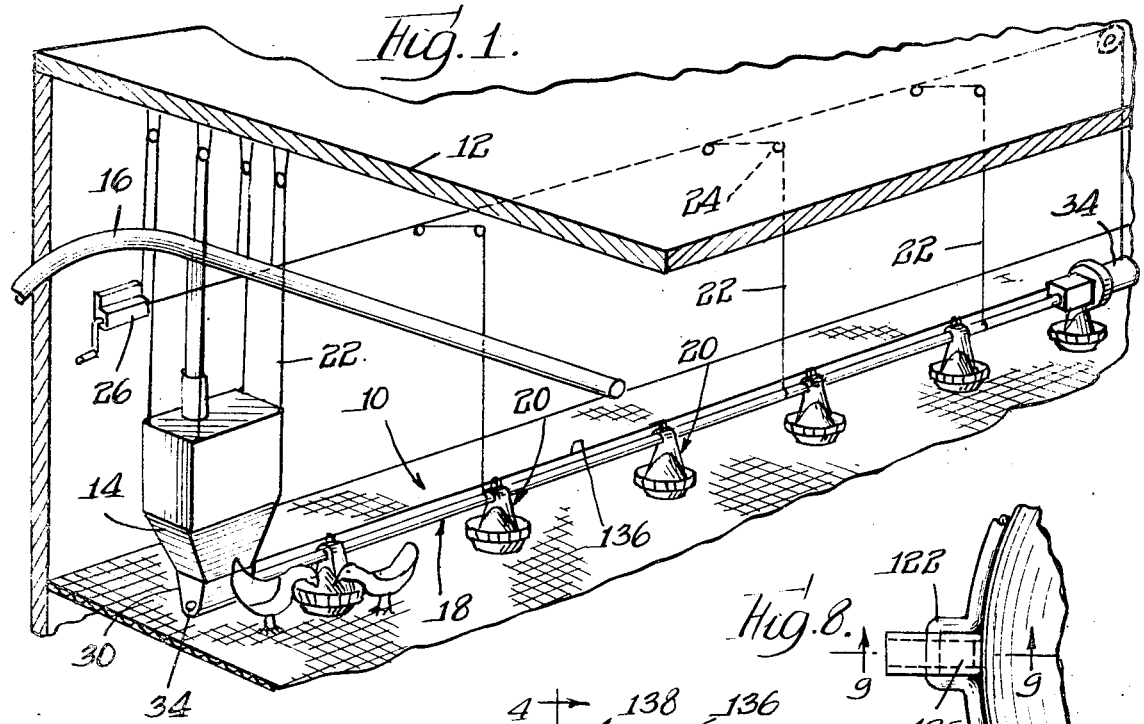
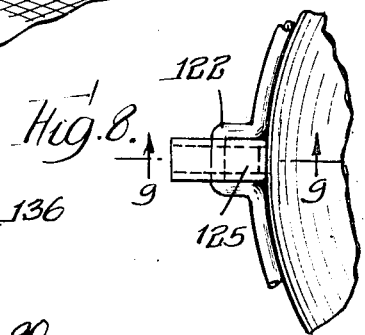
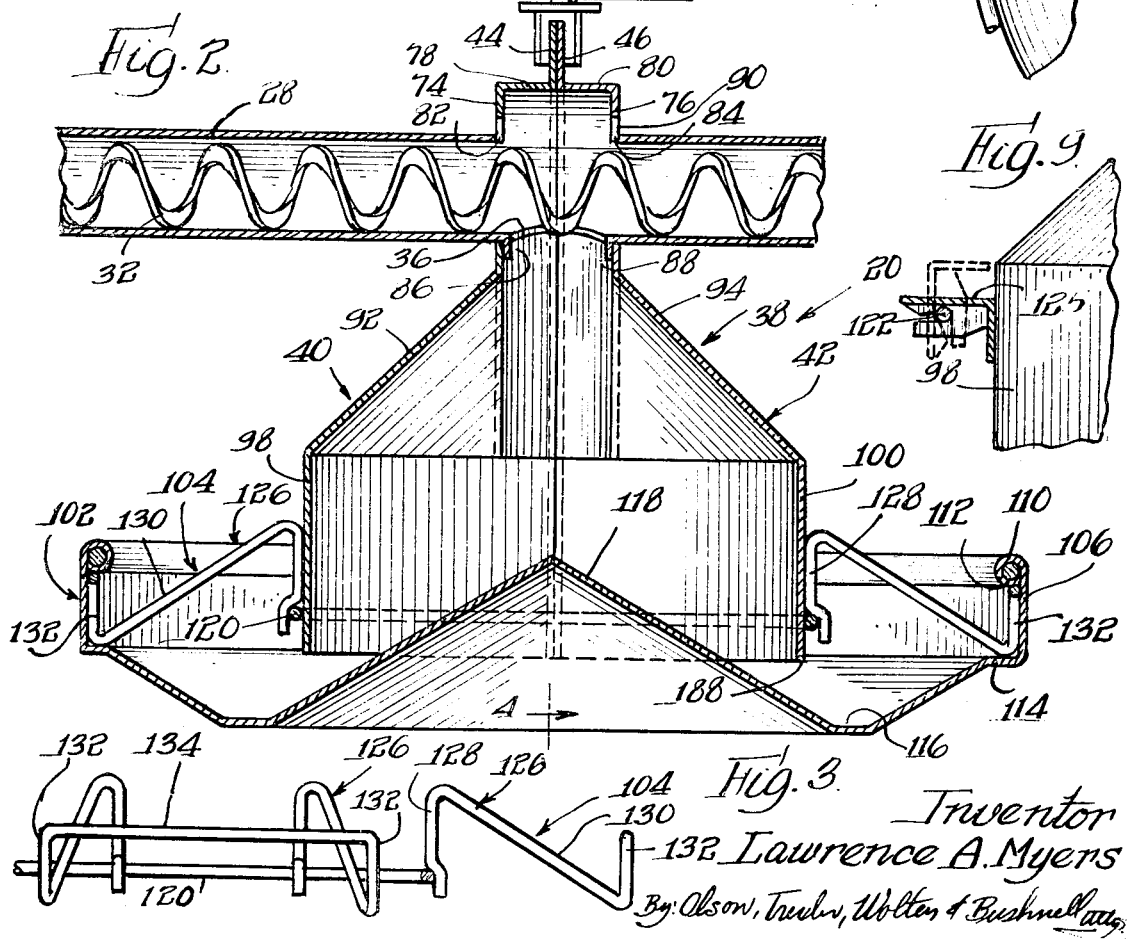
Inventor
Lawrence A. Myers
By Olson, Trexler, Wolters & Bushnell attys May 12, 1970 — L. A. MYERS — 3,511,215
POULTRY FEEDER
Filed Dec. 26, 1967 — 2 Sheets-Sheet 2
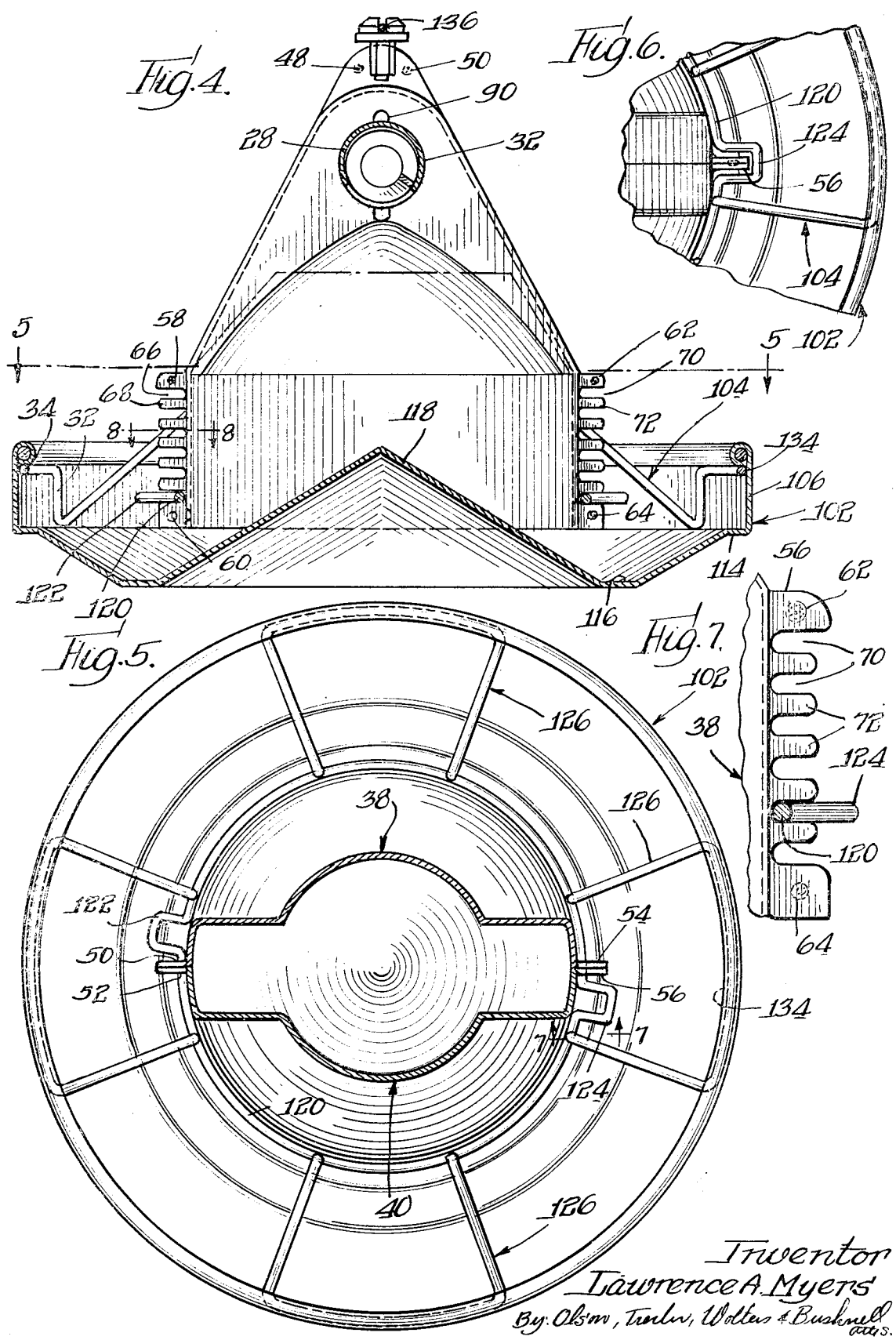
Inventor
Lawrence A. Myers
By Olsen, Trexler, Wolters & Bushnell
Attys.

United States Patent Office 3,511,215
Patented May 12, 1970

---

3,511,215
POULTRY FEEDER
Lawrence A. Myers, Milford, Ind., assignor to Chore-Time Equipment, Inc., Milford, Ind., a corporation of Indiana
Filed Dec. 26, 1967, Ser. No. 693,500
Int. Cl. A01k *39/00*
U.S. Cl. 119—53   6 Claims

ABSTRACT OF THE DISCLOSURE

There is disclosed a poultry feeder having means for conveying feed down a line and a plurality of dispensing assemblies mounted along said line. Each of the assemblies includes an inverted cone or chamber supported from the conveyor, a pan disposed beneath and spaced from the lower edge of the cone, and a wire grid rigidly but adjustably supporting the pan from the cone.

---

The present invention relates to feeding apparatus, and more specifically to a novel poultry feeder.

A poultry feeder of a general type contemplated herein is disclosed in Myers et al. Pat. 3,230,933. This feeder has proved to be highly successful and, in general, comprises a feed conveyor supported for vertical adjustment, and a plurality of dispensing pan assemblies located along the conveyor. Each of these assemblies includes a dispensing pan rigidly connected with the conveyor in a manner so as to be capable of supporting the entire assembly on the floor when the feeder is bodily vertically adjusted downwardly. This prior feeder also includes a storage chamber or tube positioned between the conveyor and the bottom of the pan for receiving and retaining a desired quantity of feed.

While the aforesaid feeder apparatus has been and still is very satisfactory, it is sometimes found desirable to increase the storage capacity of the feeder a significant amount. It is therefore an important object of the present invention to provide a novel feeder apparatus of the above described general type which is constructed so as to greatly increase the storage capacity of the dispensing pan assemblies and so that it may be simply and economically fabricated an assembled.

Another important object of the present invention is to provide a novel feeder apparatus of the above described type wherein the dispensing pan assemblies each include a storage chamber or cone and novel means for adjustably connecting a pan beneath the storage chamber or cone in secure and relatively rigid relationship.

Still another more specific object of the present invention is to provide a feeder apparatus having a dispensing assembly of the above described type which includes novel grid means easily and securely connectable to a dispensing pan without the aid of auxiliary fastening devices and quickly and easily adjustably connectable to a dispensing chamber or cone member.

A still further object of the present invention is to provide a novel apparatus of the above described type which is of rugged and reliable construction.

Other objects and advantages of the present invention will become apparent from the following description and the accompanying drawings wherein:

FIG. 1 is a fragmentary perspective view showing a feeder apparatus incorporating features of the present invention;

FIG. 2 is an enlarged fragmentary sectional view showing a portion of the feeder apparatus including a dispensing pan assembly;

FIG. 3 is a fragmentary elevational view of a novel wire grid member utilized in the apparatus of the present invention for securing a dispensing pan with respect to a storage chamber or cone member;

FIG. 4 is a sectional view taken along line 4—4 in FIG. 2;

FIG. 5 is a sectional view taken generally along line 5—5 in FIG. 4;

FIG. 6 is a fragmentary view similar to FIG. 5 and showing the manner in which the parts may be turned relative to each other for adjustment purposes;

FIG. 7 is an enlarged fragmentary sectional view taken generally along line 7—7 in FIG. 5;

FIG. 8 is an enlarged fragmentary sectional view taken along line 8—8 in FIG. 4; and FIG. 9 is an enlarged fragmentary partial sectional view taken along line 9—9 in FIG. 8.

Referring now more specifically to the drawings wherein like parts are designated by the same numerals throughout the various figures, a feeder apparatus 10 incorporating features of the present invention is shown in FIG. 1 installed in a suitable building 12. In general, the apparatus 10 comprises a hopper 14 which may be filled with feed manually or may be supplied by any suitable conveying means 16. The hopper 14 is connected with a generally horizontally extending conveyor 18 from which feed pan assemblies 20 are suspended at spaced intervals.

The hopper 14 and conveyor 18 are vertically adjustably supported by cables 22 connected thereto. These cables extend over pulleys 24 suitably mounted on the building 12 and are in turn connected with a winch unit 26.

In the embodiment shown, the conveyor 18 comprises a conduit or tube 28 extending from a connection with a fitting 30 at the lower end of the hopper 14 in a substantially straight line. It is to be understood that the length of the conveyor may be adjusted or varied in accordance with the size of the poultry house involved. In general, the conveyor will extend substantially throughout the length of the poultry house. A centerless auger 32 is rotatably disposed within the conduit or tube 28. The hopper end of the auger is preferably anchored by suitable bearing unit 34 mounted in the fitting 30 and the opposite or downstream end of the auger is secured to the output drive shaft of an electric motor and speed reducing unit 34 which is suitably connected with a source of electric power.

The tube 28 is preferably provided in relatively short lengths suitably joined together. At spaced intervals along the length of the conveyor, the tube 28 is formed with discharge openings 36 in the lower side thereof, which openings register with the dispensing pan assemblies 20.

Each of the dispensing assemblies 20 has a combined hanger and storage chamber or cone member 38 preferably formed from identical but oppositely stamped sheet metal sections 40 and 42. These sections have abutting upper end flanges 44 and 46 spot-welded together as indicated at 48 and 50 in FIG. 4. The sections also include abutting side marginal flanges 50–52 and 54–56 which are spot-welded together at 58, 60, 62 and 64 as shown in FIGS. 4, 5 and 7. The abutting flanges 50–52 are formed with vertically spaced laterally outwardly opening slots 66 with finger portions 68 therebetween and the flanges 54–56 are formed with identical slots 70 and finger portions 72 for a purpose to be described below.

Upper end portions of the sections 40 and 42 are formed with substantially flat parallel end walls 74 and 76 which are spaced from each other by substantially abutting side walls 78 and 80 a distance slightly greater than the width of the discharge opening 36 as shown in FIG. 2. Axially aligned apertures 82 and 84 are formed in the end walls 74 and 76 for receiving the conveyor tube or conduit 28. The diameter of the apertures 82 and 84 is similar to and preferably slightly greater than the outside diameter of the tube 28 so that the pan assembly is adapted to swing freely on the tube.

In order to fix the combined hanger and storage member 38 axially with respect to the tube and in alignment with the discharge opening 36, tabs 86 and 88 are formed integrally with the tube and project downwardly for engaging the interior surfaces of the end walls 74 and 76 as shown in FIG. 2. Notches 90 are formed in the end walls 74 and 76 as shown best in FIG. 4. These notches are slightly larger than the tabs 86 and 88. Thus, the member 38 may be assembled with the tube 28 by sliding the tube 28 through the apertures 82 and 84 with the member 38 in an inverted position so that the tabs 86 and 88 may enter within the wall 74 and 76 through the notches 90. When the member 38 is properly axially positioned with respect to the tube, the member is rotated relative to the tube from the inverted position to the proper position shown in FIG. 2.

The side walls 78 and 80 extend downwardly in diverging relationship as shown in FIG. 4 and the end walls 74 and 76 are formed beneath the tube 28 with flaring sections 92 and 94. These flaring sections merge with cylindrical portions 98 and 100 defining a relatively large diameter and high capacity storage chamber at the lower end of the member 38.

A dispensing pan or tray 102 is disposed beneath the hanger and storage member 38 and is adjustably and rigidly connected thereto by a wire grid structure 104 as will be described below. The pan has a substantially cylindrical side wall 106 with a diameter substantially greater than the maximum diameter of the member 38 and positioned so as to extend above a lower annular margin 108 of the member 38. An upper margin of the pan side wall merges with an inturned bead 110 providing a downwardly facing shoulder 112. The pan is formed with a bottom which extends initially substantially radially inwardly from a lower margin of the side wall 106 for providing a ledge 114. From the ledge 114, the bottom extends downwardly and thence upwardly so as to define an annular trough 116 of generally V-shaped transverse cross-section and a central conical portion 118 which projects upwardly within the storage and hanger member 38.

The central conical portion 118 directs feed radially outwardly from within the hanger and chamber member 38 and into trough 116 from which the birds may eat. The quantity of feed which may be delivered into the trough 116 at any one time may be effectively controlled by vertically adjusting the pan with respect to the member 38 so as to open or close the gap between the lower edge 108 of the member 38 and the bottom of the pan.

As previously indicated, the pan is rigidly and adjustably connected with the member 38 by the grid structure 104. This structure comprises an inner ring or hoop 120 having an internal diameter similar to the external diameter of the lower end of the storage member 38. The tube is adapted to fit snugly around the lower cylindrical portion of the storage chamber and while the hoop is continuous, it is provided with diametrically oppositely disposed laterally outwardly projecting loops 122 and 124. As shown in FIGS. 4, 5 and 7, the hoop or ring 120 is adapted to extend through the slots 66 and 70 in the laterally extending flanges at opposite sides of the member 38 so that the related finger elements 68 and 70 underlie and overlie the hoop and thereby positively secure the grid structure 104 in the desired adjusted position with respect to the member 38.

During initial assembly of the grid structure with the member 38 or during subsequent vertical adjustment on the grid structure, the hoop or ring member 120 is rotated or positioned with respect to the member 38 so that the loops 122 and 124 are respectively aligned with the flanges 50–52 and 54–56 as shown in FIG. 6.

With the parts in this relative position, it is seen that the hoop or ring 120 may be manually vertically raised or lowered with respect to the member 38 to the desired position. When such position has been reached, the ring member 120 is then rotated relative to the member 8 so as to shift the loop portions 122 and 124 circumferentially out of alignment with the aforementioned flanges and cause the ring member 120 to again engage the finger elements. In order to lock the grid structure in position a latch element 125 is pivoted on the loop 122 for movement between the broken and solid line positions shown in FIGS. 8 and 9. When the latch element is wedged against the member 38 as shown in solid lines in FIG. 9 it effectively prevents accidental alignment of the loops 122 and 124 with the flanges 50–52 and 54–56.

Spaced around and welded or otherwise secured to the hoop 120 are wire spokes 126. Each of these spokes has a first inner end portion 128 which extends upwardly from the hoop 120 along an imaginary cylinder having a diameter substantially equal to the outside diameter of the cylinder wall portions 98 and 100. Thus, the sections 128 of the wire spokes engage the wall sections 98 and 100 throughout a substantial axial length thereof for preventing tilting or canting of the grid structure 104 and the pan relative to the member 38.

The upstanding leg sections 128 of the wire spokes merge with generally radially outwardly extending and downwardly inclined intermediate portions 130 which extend toward the ledge portion 114 of the pan as shown in FIG. 2 and respectively merge with upstanding portions 132. The portions 132 extend between the upwardly facing surface of the ledge 114 and the downwardly facing surface of the inturned bead 110 of the pan and merge with a bight portion 134 disposed beneath and engaging the shoulder 112 of the pan. The arrangement is such that adjacent spoke elements 126 are paired together and integrally joined by the bight portions 134. The bight portions have a substantial length circumferentially of the pan so that the various spokes 126 are spaced from each other sufficiently to provide access openings therebetween for permitting the birds to eat the feed from the trough section 116 of the pan. These access openings are sufficiently narrow and the position of the spokes 126 is such that the grid structure not only serves to connect the pan adjustably and rigidly with respect to the member 38, but also serves to prevent the birds from scratching an excess of feed into the pan and from spilling the feed from the pan onto the floor.

With the structure described above, it is seen that the dispensing pan assemblies may be quickly and easily assembled with the conveyor tube without the aid or necessity of auxiliary fastening devices. The fully assembled pan assemblies are free to rotate relative to the tube so as to minimize any possibility of being injured or bent in the event the bird jumps or lands on the edge of the pans. However, such rotation in the final assembly is minimized by stringing a wire 136 above the conveyor and connecting the wire to fittings 138 mounted on top of each of the members 30 as shown in FIG. 2. The wire 136 also serves as an antiroost device and may be electrified if desired.

The construction of the combined hanger and storage member 38 not only provides for a rugged and sturdy support for the pan, but also substantially increases the feed storage capacity of the feeder apparatus. The relatively large diameter of the lower end portion of the member 38 enables the radial extent of the grid structure 104 to be minimized for promoting more economical construction and greater durability. This construction also promotes rigidity so that in the event the feeder apparatus is lowered until the pans rest on the ground, the apparatus will be adequately supported by the pans through the grid structures and the desired adjustment between the lower edges 108 of the members 38 and the pans will be maintained.

While a preferred embodiment of the present invention has been shown and described herein, it is obvious that many structural details may be changed without departing from the spirit and scope of the appended claims.

The invention is claimed as follows:

1. A feed dispensing assembly for assembly over a conveyor tube of an animal feeder comprising a hollow feed storage member adapted to be secured to and to depend from the conveyor tube for receiving feed therefrom, a pan disposed beneath said member, and means substantially rigidly and adjustably connecting said pan to and in predetermined spaced relationship from said member, said member including a pair of generally parallel spaced apart wall portions having apertures therein for receiving the conveyor tube, and said wall portions flaring outwardly beneath said apertures, said member having transverse dimensions adjacent a lower end thereof substantially greater than the spacing between said parallel wall portions.

2. A feeder including an elongated conveyor comprising a tube having a plurality of discharge openings at spaced intervals, means vertically adjustably supporting said conveyor, and a plurality of feed dispensing assemblies as defined in claim 1 connected to and depending from said conveyor tube, said assemblies respectively being disposed in association with said discharge openings.

3. A feeder, as defined in claim 2, wherein each of said feed dispensing assemblies includes a plurality of series of laterally projecting vertically spaced finger elements on its hollow feed storage member, and said connecting means of each of the dispensing assemblies comprises an element disposed around said storage member and projecting between said finger elements.

4. A feeder, as defined in claim 3, wherein said element projecting between the finger elements comprises a hoop, and said hoop being rotatable relative to said hollow member and including laterally projecting loop means alignable with said finger elements for enabling the hoop to disengaged from the finger elements.

5. In a poultry feeder having a conveyor, a feed dispensing assembly comprising a hollow feed storage member adapted to be secured to and to depend from the conveyor for receiving feed therefrom, a pan disposed beneath said member, and means including a grid structure comprising a plurality of space spoke elements extending generally radially between said member and said pan substantially rigidly and vertically adjustably connecting said pan to and in predetermined spaced relationship from said member, said member including a plurality of vertically spaced abutments defining a plurality of laterally opening slots therebetween, said grid structure including a ring element selectively positionable in said slots and engageable between said abutments for adjustably securing the grid structure against vertical movement relative to said member, said ring element comprising a loop portion selectively alignable with said abutments for enabling the ring element to be disengaged from the abutments to enable the grid structure and pan carried thereby to be vertically adjusted relative to said member.

6. A dispensing assembly, as defined in claim 5, wherein said pan includes a generally upstanding peripheral wall having opposed upwardly and downwardly facing surfaces, said grid structure including outer end portions extending between and engageable with said surfaces of the pan.

References Cited
UNITED STATES PATENTS

| | | | |
|---|---|---|---|
| 2,941,506 | 6/1960 | Fulton | 119—53 |
| 3,230,933 | 1/1966 | Myers et al. | 119—53 |
| 3,330,255 | 7/1967 | Scott et al. | 119—56 X |
| 3,388,690 | 6/1968 | Hostetler | 119—53 |
| 3,389,689 | 6/1968 | Van Huis | 119—52 |

ALDRICH F. MEDBERY, Primary Examiner